(12) United States Patent
Pham et al.

(10) Patent No.: US 12,463,468 B2
(45) Date of Patent: Nov. 4, 2025

(54) SYSTEM AND METHOD FOR WIRELESS POWER TRANSMISSION

(71) Applicant: CANADIAN TIRE CORPORATION, LIMITED, Toronto (CA)

(72) Inventors: Wendy Tran Pham, Toronto (CA); Samuel Cheng, Toronto (CA); Tomasz Piotrowski, Toronto (CA); Abdul Haleem Ahamed Koya, Oakville (CA); Phil Lam, Toronto (CA)

(73) Assignee: CANADIAN TIRE CORPORATION, LIMITED, Toronto (CA)

( * ) Notice: Subject to any disclaimer, the term of this patent is extended or adjusted under 35 U.S.C. 154(b) by 0 days.

(21) Appl. No.: 18/664,038

(22) Filed: May 14, 2024

(65) Prior Publication Data
US 2024/0388136 A1   Nov. 21, 2024

Related U.S. Application Data

(60) Provisional application No. 63/466,754, filed on May 16, 2023.

(51) Int. Cl.
| | |
|---|---|
| *H02J 50/27* | (2016.01) |
| *H02J 50/00* | (2016.01) |
| *H05B 47/19* | (2020.01) |

(52) U.S. Cl.
CPC ............ *H02J 50/27* (2016.02); *H02J 50/005* (2020.01); *H05B 47/19* (2020.01)

(58) Field of Classification Search
None
See application file for complete search history.

(56) References Cited

U.S. PATENT DOCUMENTS

| | | | |
|---|---|---|---|
| 6,856,291 B2 | 2/2005 | Mickle et al. | |
| 7,197,113 B1 * | 3/2007 | Katcha .................. | A61B 6/032 378/104 |
| 7,639,994 B2 | 12/2009 | Greene et al. | |
| 7,643,312 B2 | 1/2010 | Vanderelli et al. | |
| 7,812,771 B2 | 10/2010 | Greene et al. | |
| 8,380,255 B2 | 2/2013 | Shearer et al. | |
| 8,432,062 B2 | 4/2013 | Greene et al. | |
| 8,461,817 B2 | 6/2013 | Martin et al. | |
| 9,107,579 B2 | 8/2015 | Greene | |
| 10,284,019 B2 | 5/2019 | Shearer et al. | |

(Continued)

*Primary Examiner* — Rexford N Barnie
*Assistant Examiner* — Joel Barnett
(74) *Attorney, Agent, or Firm* — NORTON ROSE FULBRIGHT CANADA LLP (57) ABSTRACT

There is provided a system for wireless power transmission comprising at least one radio frequency transmitter configured to emit radio frequency waves, at least one radio frequency receiver remote from the at least one radio frequency transmitter, the at least one radio frequency receiver comprising at least one antenna configured to wirelessly receive the radio frequency waves from the at least one radio frequency transmitter, and at least one rectifier electrically coupled to the at least one antenna and configured to convert the radio frequency waves to direct current (DC) power, and at least one load electrically coupled to the at least one radio frequency receiver, the at least one load configured to receive from the at least one rectifier the DC power and to operate based thereon.

23 Claims, 8 Drawing Sheets

(56) References Cited

U.S. PATENT DOCUMENTS

| | | | |
|---|---|---|---|
| 2007/0222681 A1* | 9/2007 | Greene | H02J 50/005 |
| | | | 343/702 |
| 2015/0326070 A1* | 11/2015 | Petras | H02J 50/60 |
| | | | 307/104 |
| 2018/0337534 A1* | 11/2018 | Bell | H02J 50/402 |
| 2020/0136438 A1* | 4/2020 | Seong | G05D 1/028 |
| 2020/0244104 A1* | 7/2020 | Katajamaki | H04B 5/79 |

* cited by examiner

SYSTEM AND METHOD FOR WIRELESS POWER TRANSMISSION

CROSS-REFERENCE TO RELATED APPLICATIONS

This patent application claims priority of U.S. application No. 63/466,754 filed May 16, 2023, the entire contents of which are incorporated herein by reference.

FIELD

The improvements generally relate to the field of wireless power transmission, and more particularly to the conversion of radio frequency (RF) energy to direct current (DC) power.

BACKGROUND

In several applications, it may be desirable to transmit electrical power without a physical link, i.e. without the use of electrical wires. Existing wireless power transmission systems generally require multiple interconnected components and thus prove complex and costly. For example, a large amount of wiring is often required for systems that comprise several components (e.g., multiple lights to be powered). Such existing systems also fail to prove user-friendly since they typically make manipulation (e.g., repositioning) of the system components by a user cumbersome. Therefore, there is a need for improvement.

SUMMARY

In accordance with one aspect, there is provided a system for wireless power transmission. The system comprises at least one radio frequency transmitter configured to emit radio frequency waves, at least one radio frequency receiver remote from the at least one radio frequency transmitter, the at least one radio frequency receiver comprising at least one antenna configured to wirelessly receive the radio frequency waves from the at least one radio frequency transmitter, and at least one rectifier electrically coupled to the at least one antenna and configured to convert the radio frequency waves to direct current (DC) power, and at least one load electrically coupled to the at least one radio frequency receiver, the at least one load configured to receive from the at least one rectifier the DC power and to operate based thereon.

In accordance with another aspect, there is provided a radio frequency receiver comprising at least one antenna configured to wirelessly receive radio frequency waves emitted by at least one radio frequency transmitter remote from the radio frequency receiver, and a rectifier electrically coupled to the at least one antenna and configured to convert the radio frequency waves to direct current (DC) power and to output the DC power to at least one load to cause the at least one load to operate based on the DC power.

In accordance with another aspect, there is provided a method for wireless power transmission. The method comprises wirelessly receiving, at least one antenna of at least one radio frequency receiver, radio frequency waves emitted by at least one radio frequency transmitter remote from the at least one radio frequency receiver, converting, at a rectifier of the at least one radio frequency receiver, the radio frequency waves to direct current (DC) power, and outputting, at the rectifier, the DC power to at least one load to cause the at least one load to operate based on the DC power.

Many further features and combinations thereof concerning embodiments described herein will appear to those skilled in the art following a reading of the instant disclosure.

DESCRIPTION OF THE FIGURES

In the figures.

DETAILED DESCRIPTION

Described herein are systems and methods for wireless power transmission. In one embodiment, using the systems and methods described herein, small amounts of electrical power may be transmitted over short distances. As used herein, the term "small", when referring to an amount (or level) of electrical power, refers to amounts (or levels) of power lower than or equal to about 50 mW. As used herein, the term "short distance" refers to a distance lower than or equal to about two (2) meters. For example, in some embodiments, the systems and methods described herein may allow to transmit about 50 mW over distances of about 0.2 m. In other embodiments, the systems and methods described herein may allow to transmit about 5 mW over distances of about 2 m.

The systems and methods described herein may find application in any environment in which wireless transmission of electrical energy over short distances is desired, particularly in environments where wiring may prove inconvenient and/or difficult to install. Such applications include, but are not limited to, Christmas tree and ornament lighting, under-cabinet lighting, and toys having multiple components that need lighting.

Figure 1:
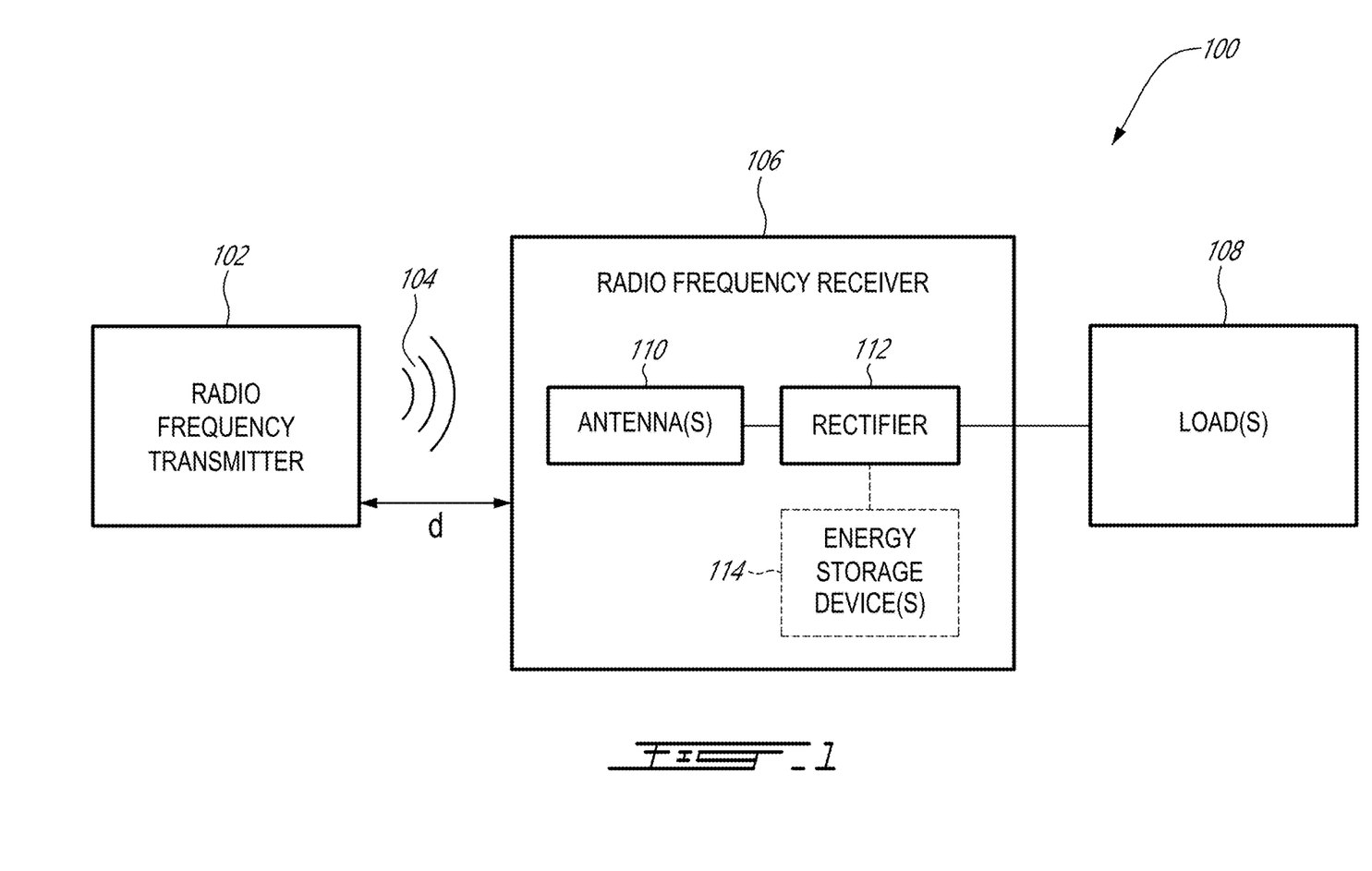
FIG. 1 is a schematic diagram of an example system for wireless power transmission, in accordance with one embodiment.

FIG. 1 shows an example of a system 100 for wireless power transmission, in accordance with one embodiment. The system 100 may be used for wirelessly transmitting small amounts of power over short distances, for use in a variety of applications. In one embodiment, the system 100 is used for lighting purposes. The system 100 comprises a number of electronic components which may be integrated with one or more mechanical components required to complete a given product (e.g., a light, ornament, toy, or the like) configured to operate based on the wirelessly transmitted power.

In one embodiment, the system 100 comprises a radio frequency (RF) transmitter 102 configured to transmit (e.g., into free space) RF waves 104, which are received at an RF receiver 106. In one embodiment, the RF transmitter 102 comprises a polarized antenna (not shown) that is matched to (i.e. polarized in the same manner as) antenna(s) 110 provided in the RF receiver 106. The RF receiver 106 is remote from the RF transmitter 102 and is positioned along a transmission path thereof. The RF receiver 106 and the RF transmitter 102 are separated by a distance d, which corresponds to the effective transmission range of the RF transmitter 102 and to the effective receiving range of the RF receiver 106. In one embodiment, the distance d is lower than or equal to 2 m. It should however be understood that any other suitable distance may apply. In one embodiment, the RF transmitter 102 and the RF receiver 106 are configured to operate in a range of frequencies ranging between about 10 MHz and about 6 GHz. It should however be noted that for operating frequencies of about 5 GHz and above, the bandwidth of RF diodes used in the system 100 limits the system's power harvesting efficiency. Furthermore, it should be noted that, for efficiency purposes, it is desirable for the antenna(s) 110 to be tuned for a single operating frequency, such that every operating frequency may require an antenna 110 of a specific size.

The RF transmitter 102 may comprise any suitable transmitter configured to transmit RF waves over a given distance at a suitable effective radiated power (ERP). As used herein, the term "effective radiated power" refers to a measure of the power density that the RF transmitter 102 radiates in the direction of maximal strength of its radiation pattern. In one embodiment, the RF transmitter 102 has an ERP of about 3 W and is configured to emit RF waves having a center frequency of about 915 MHz. When the RF transmitter 102 is so configured, the RF receiver 106 outputs between about 5 mW and about 50 mW of direct current (DC) electrical power at a voltage of between about 3 V and about 5 V. It should however be understood that other embodiments may apply. Furthermore and as will be described further below, although a single RF transmitter 102 and a single RF receiver 106 are illustrated in FIG. 1, it should be understood that the system 100 may comprise multiple RF transmitters as in 102 and/or multiple RF receivers as in 106, each RF transmitter 102 configured to emit RF waves 104 to one or more RF receivers as in 106 and each RF receiver 106 configured to receive RF waves from one or more RF transmitters as in 102.

The RF receiver 106 is configured to receive the RF waves 104 from the RF transmitter 102 and to convert the RF waves 104 into DC power that is in turn delivered to one or more loads 108 electrically connected to the output of the RF receiver 106. The load(s) 108 may comprise any suitable load(s) that operate based on DC power. In one embodiment, the load(s) 108 comprise one or more devices or components configured to produce light based on the DC power. For example, the load(s) 108 may be one or more electric lights (e.g., light bulbs, lamps, etc.) or one or more devices (e.g., toys, ornaments, etc.) having electric lights integrated therein. Any suitable type of electric lights including, but not limited to, light emitting diodes (LEDs), may apply. It should however be understood that the load(s) 108 may comprise any other suitable device(s), including, but not limited to, batteries.

In the illustrated embodiment, the RF receiver 106 comprises at least one antenna 110 connected to a rectifier 112. The antenna(s) 110 and rectifier 112 may, together, be referred to as a "rectenna". Although illustrated as separate elements, the antenna(s) 110 and rectifier 112 may be integrated together as a single element. Each antenna 110 is configured to receive the RF waves 104 emitted by the RF transmitter 102 and the rectifier 112 is configured to convert the RF waves 104 received at the antenna(s) 110 to direct current (DC) power. The RF-to-DC conversion efficiency of the rectenna may depend on the intensity of the RF waves 104 and on the configuration of the load(s) 108.

In one embodiment, the rectifier 112 is a full-wave diode rectifier comprising two half-wave diode rectifiers arranged such that a full RF wave received from the antenna(s) 110 is converted to DC power, as will be described further below. It should however be understood that the rectifier 112 may comprise any other suitable type of rectifying circuit configured to convert RF waves to DC power, including, but not limited to a single shunt full-wave rectifier, a hybrid rectifier, voltage doubling circuits, or any suitable rectifying device or combination of devices.

Still referring to FIG. 1, the RF receiver 106 may optionally comprise energy storage device(s) 114 electrically coupled to the rectifier 112. The energy storage device(s) 114 may be configured to store therein at least part of the DC output power generated by the rectifier 112, for subsequent use (e.g., subsequent transmission to the load(s) 108). The RF receiver 106 may indeed be configured to output DC power to the load(s) 108 in real-time (i.e. as the RF waves 104 are converted to DC power by the rectifier 112) or in a delayed manner (i.e. a predetermined time period after the RF waves 104 have been converted to DC power by the rectifier 112), by retrieving the stored DC power from the energy storage device(s) 114. The energy storage device(s) 114 may include, but are not limited to, one or more capacitors, one or more supercapacitors, and/or one or more inductors.

Figure 2:
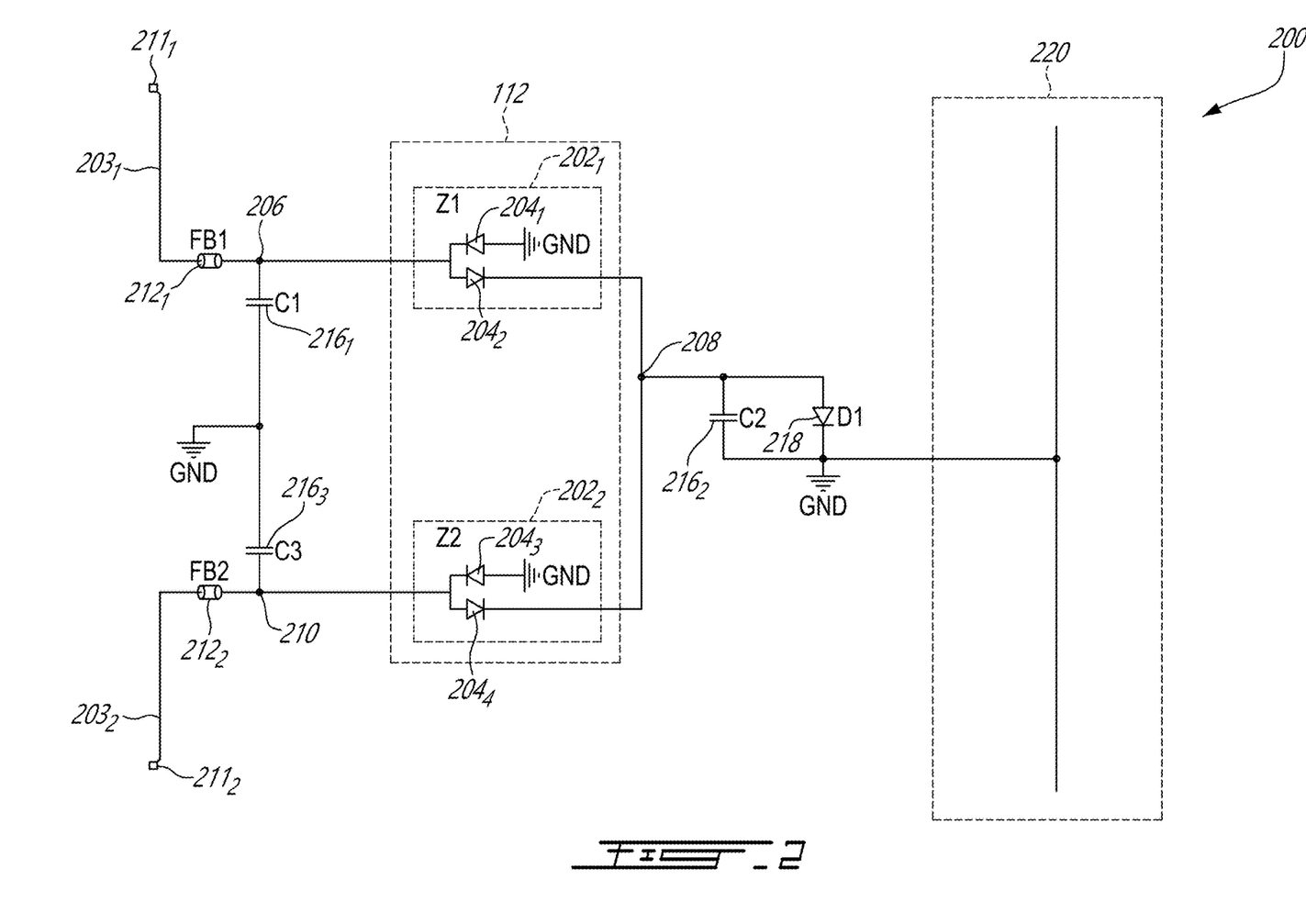
FIG. 2 a circuit diagram illustrating the topology of the receiver of FIG. 1, in accordance with one embodiment.

FIG. 2 is a circuit diagram 200 that illustrates an example topology of the RF receiver (reference 106 in FIG. 1), in accordance with one embodiment. In the illustrated embodiment, the rectifier 112 comprises a first half-wave rectifier $202_1$ and a second half-wave rectifier $202_2$ electrically coupled to the first half-wave rectifier $202_1$. Each half-wave rectifier $202_1$, $202_2$ is electrically coupled to a respective one of lines $203_1$, $203_2$ which are representative of a dual feed line antenna used as the antenna 110 of FIG. 1. The half-wave rectifiers $202_1$, $202_2$ join their outputs to form a combined DC output which is provided to the load(s) (reference 108 in FIG. 1). In one embodiment, each half-wave rectifier $202_1$, $202_2$ comprises two diodes. In particular, the first half-wave rectifier $202_1$ comprises a first diode $204_1$ and a second diode $204_2$. The cathode of the first diode $204_1$ is connected to a node 206 and the anode of the first diode $204_1$ is connected to ground, while the anode of the second diode $204_2$ is connected to the node 206 and the cathode of the second diode $204_2$ is connected to a node 208. Similarly, the second half-wave rectifier $202_2$ comprises a third diode $204_3$ and a fourth diode $204_4$. The cathode of the first diode $204_3$ is connected to a node 210 and the anode of the third diode $204_3$ is connected to ground, while the anode of the fourth diode $204_4$ is connected to the node 210 and the cathode of the fourth diode $204_4$ is connected to the node 208. In one embodiment, the diodes $204_1$, $204_2$, $204_3$, and $204_4$ are high-frequency diodes. For example, Schottky diodes may be used. It should however be understood that any other suitable diode having a desired power conversion efficiency at small incident power levels over a desired frequency range (e.g., between about 10 MHz and about 6 GHz) may apply.

In one embodiment, a first inductor $212_1$ is coupled to line $203_1$, between node $211_1$ and node 206, and a second inductor $212_2$ is coupled to line $203_2$, between node $211_2$ and node 210. The inductors $212_1$, $212_2$ are matching inductors that may be used for impedance matching, to filter the RF waves received at the antenna 110. The inductors $212_1$, $212_2$ may have any suitable inductance value, depending on the application, the inductance value being chosen to maximize power transfer between the antenna 110 and the rectifier 112. In one embodiment, the inductance value is 15 nH.

A capacitor $216_1$ is connected between node 206 and ground, and another capacitor $216_3$ is connected between node 210 and ground. The capacitors $216_1$ and $216_3$ are thus connected to the input of the rectifier 112 and may be used for impedance matching between the antenna 110 and the rectifier 112 (i.e. to optimize power transfer). It should be understood that the capacitors $216_1$, $216_3$ may, in some embodiments, be omitted from the circuit diagram 200. A capacitor $216_2$ is further connected to the output of the rectifier 112, namely to the cathodes of diodes $204_2$, $204_4$, between node 208 and ground. The capacitors $216_1$, $216_2$, and $216_3$ may have any suitable capacitance value, depending on the application.

In one embodiment, the capacitor $216_2$ is a bypass capacitor used to stabilize the DC output of the rectifier 112 by bypassing (i.e. filtering out) alternating current (AC) noise that may be on the rectifier's DC output (i.e. at node 208). For this purpose, the bypass capacitor is configured to short AC signals to ground, so that any AC noise that may be present on the rectifier's DC output is removed. This in turn allows to smooth out the DC signal, producing a cleaner DC output (i.e. without any AC ripples) for delivery to the load(s) 108. In one embodiment, such a bypass capacitor has a capacitance of about 5.6 pF.

In other embodiments, depending on the demands of the load(s) 108 for DC output power, a high-capacity capacitor (referred to herein as a "supercapacitor") may be used as the capacitor $216_2$. The rectifier's DC output may be used to charge the supercapacitor, which, once charged, discharges into the load(s) 108. The load(s) 108 may then operate based on the DC power received from the supercapacitor. As long as the supercapacitor is charged, the load(s) 108 can operate, even if the RF transmitter 102 is deactivated (i.e., turned off). In some embodiments, a supercapacitor having a capacitance of about 0.022 F may be used.

The supercapacitor may be configured to store more (e.g., ten (10) to one hundred (100) times more) electrical energy and to accept and deliver electrical charge faster than a lower capacity capacitor (referred to herein as a "regular" capacitor). As a result, when the supercapacitor discharges electrical energy into the load(s) 108, the load(s) 108 can operate for a longer period of time than would be the case had a regular capacitor been used. More specifically, in embodiments where the load(s) 108 are electrical light(s), the light(s) can stay on (i.e. be illuminated) for a longer period of time when the capacitor $216_2$ is a supercapacitor. For example, the supercapacitor may have a charge time between about ten (10) seconds and fifteen (15) seconds and may, when discharged into a light, allow the light to stay on for about one (1) to two (2) minutes at a time. In comparison, a regular (e.g., 5.6 pF) capacitor may have an on/off decay time of less than one (1) microsecond.

Still referring to FIG. 2 in addition to FIG. 1, the operation of the rectifier 112 will now be described, in accordance with one embodiment. The RF waves 104 transmitted by the RF transmitter 102 are received at the antenna(s) 110 and create a differential voltage at the antenna(s) 110. The first node of the antenna 110 (e.g., node $211_1$ electrically coupled to line $203_1$) has a higher voltage than the second node of the antenna 110 (e.g., node $211_2$ electrically coupled to line $203_2$), allowing for current flow through the rectifier circuit 112 via lines $203_1$, $203_2$. The first half-wave rectifier $202_1$ allows (i.e. passes) one half-cycle (e.g., the positive half-cycle) of an RF wave 104 through, yielding a first (e.g., positive) DC voltage, and blocks the other (e.g. negative) half-cycle. This is achieved using the diode $204_2$, which may be forward biased (e.g., when the RF wave 104 is in its positive half cycle) so that current flows therethrough from node 206 to node 208, and using the diode $204_1$, which may be reverse biased so that current flow therethrough is blocked. The second half-wave rectifier $202_2$ allows the half-cycle (e.g., the negative half-cycle) that was blocked by the first half-wave rectifier $202_1$ through, yielding a second (e.g., negative) DC voltage, and blocks the other (e.g. the positive) half-cycle. This is achieved using the diode $204_4$, which may be forward biased (e.g., when the RF wave 104 is in its negative half cycle) so that current flows therethrough from node 210 to node 208, and using the diode $204_3$, which may be reverse biased so that current flow therethrough is blocked. The DC power generated at the output of the rectifier 112 is thus a combination of the first and second DC voltages generated by the half-wave rectifiers $202_1$, $202_2$. It should be noted that the current flow path continues from the positive side through the capacitor $216_2$ (and the load illustrated as an LED 218) to ground, and from ground through diodes $204_1$, $204_3$ towards the side of the antenna 110 that is at lower potential.

In the illustrated embodiment, the DC output power is used for lighting, such that the LED 218 may be used as the load(s) 108 to which the DC power output by the rectifier 112 is provided. The LED 218 is illustratively electrically connected in parallel with the bypass capacitor $216_2$, with its anode connected to node 208 and its cathode connected to ground. In one embodiment, the LED 218 is a high efficiency (e.g., 200 lumen/W) white LED. It should however be understood that any other suitable LED may apply. For example, an LED of any suitable color (e.g., red, green, blue, or the like), any suitable light output (e.g., about 1 lumen at maximum brightness), and any suitable efficiency may apply.

Still referring to FIG. 2, in some embodiments, a grounded reflector 220 may be provided to increase the gain of the antenna(s) 110 in a desired direction. In particular, the antenna(s) 110 may be configured to radiate the RF waves (reference 104 in FIG. 1) received from the RF transmitter 102 in a plurality of directions (which includes the desired direction), and the reflector 220 may be configured to reflect at least part of the RF waves radiated by the antenna(s) 110 in the desired direction. For this purpose, the reflector 220 may be positioned opposite to the desired direction. As a result, the sensitivity of the antenna 110 may be increased (e.g., by about 3 dB to about 6 dB in some embodiments) in the desired direction.

In the illustrated embodiment, the reflector 220 is implemented as a grounded trace provided on the same printed circuit board (PCB) (described herein below with reference to FIG. 4A) as the antenna(s) 110. The geometry of the reflector 220 may be similar to that of reflectors used in directional antennas, such as Yagi-Uda antennas. It is however desirable for the reflector 220 to have the same length as the antenna(s) 110, and to be separated therefrom by a given spacing. In one embodiment, a 35 mm spacing is used. The reflector 220 is electrically connected to ground, in the same manner as the cathode of diode 218.

Figure 3A:
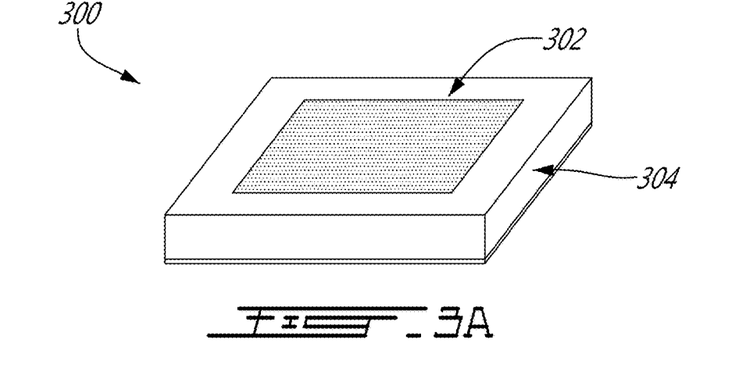
FIG. 3A is a schematic diagram of a microstrip antenna for use with the system of FIG. 1, in accordance with one embodiment.

In some embodiments, the antenna(s) 110 may comprise a single antenna. For example and as illustrated in FIG. 3A, the antenna(s) 110 may comprise a microstrip antenna 300, e.g., a microstrip patch aperture antenna. The microstrip antenna 300 may comprise a thin metallic patch 302 made of any suitable material (e.g., gold or copper) and placed on a dielectric substrate 304. The microstrip antenna 300 may be designed to operate over frequencies ranging from about 1 GHz to about 40 GHz. In one embodiment, the microstrip antenna 300 may comprise a dual linear polarization antenna having two feed lines (also referred to herein as ports, not shown), each feed line being associated with a given polarization. In the illustrated embodiment, the patch 302 has a square shape. It should however be understood that the patch 302 may have any other suitable shape (e.g. rectangular or circular). In addition, antennas with more than one patch (e.g., with stacked patches) may also apply.

Figure 3B:
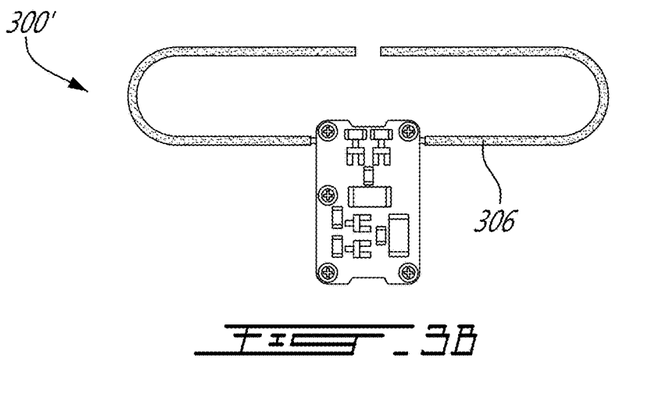
FIG. 3B is a photograph of a folded-dipole antenna for use with the system of FIG. 1, in accordance with one embodiment.
Figure 3C:
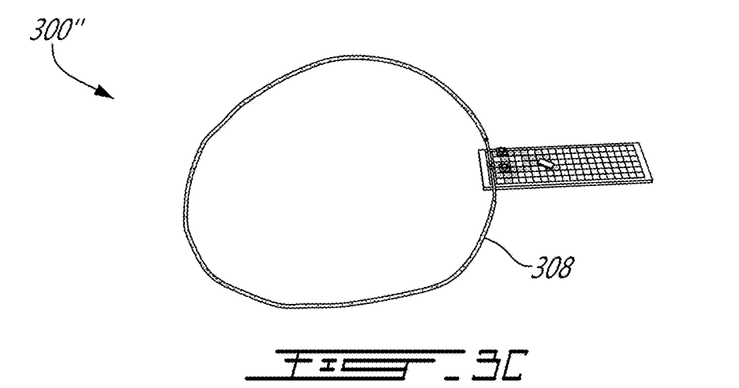
FIG. 3C is a photograph of a circular antenna for use with the system of FIG. 1, in accordance with one embodiment.

It should also be understood that any other suitable antenna including, but not limited to, a dipole antenna, a Yagi-Uda antenna, a monopole antenna, a coplanar patch antenna, a spiral antenna, and a parabolic antenna, may be used for the antenna(s) 110. FIG. 3B illustrates an example folded dipole antenna 300', which may be used for the antenna(s) 110. The folded dipole antenna 300' comprises two dipole antennas (not shown) connected in parallel, each dipole antenna folded back on itself to form a loop 306 of wire (or other electrical conductor). FIG. 3C illustrates an example circular (or loop) antenna 300", which may be used for the antenna(s) 110. The circular antenna 300" comprises a loop 308 of wire (or other electrical conductor) shaped as a closed geometric shape (e.g., a circle).

Figure 4A:
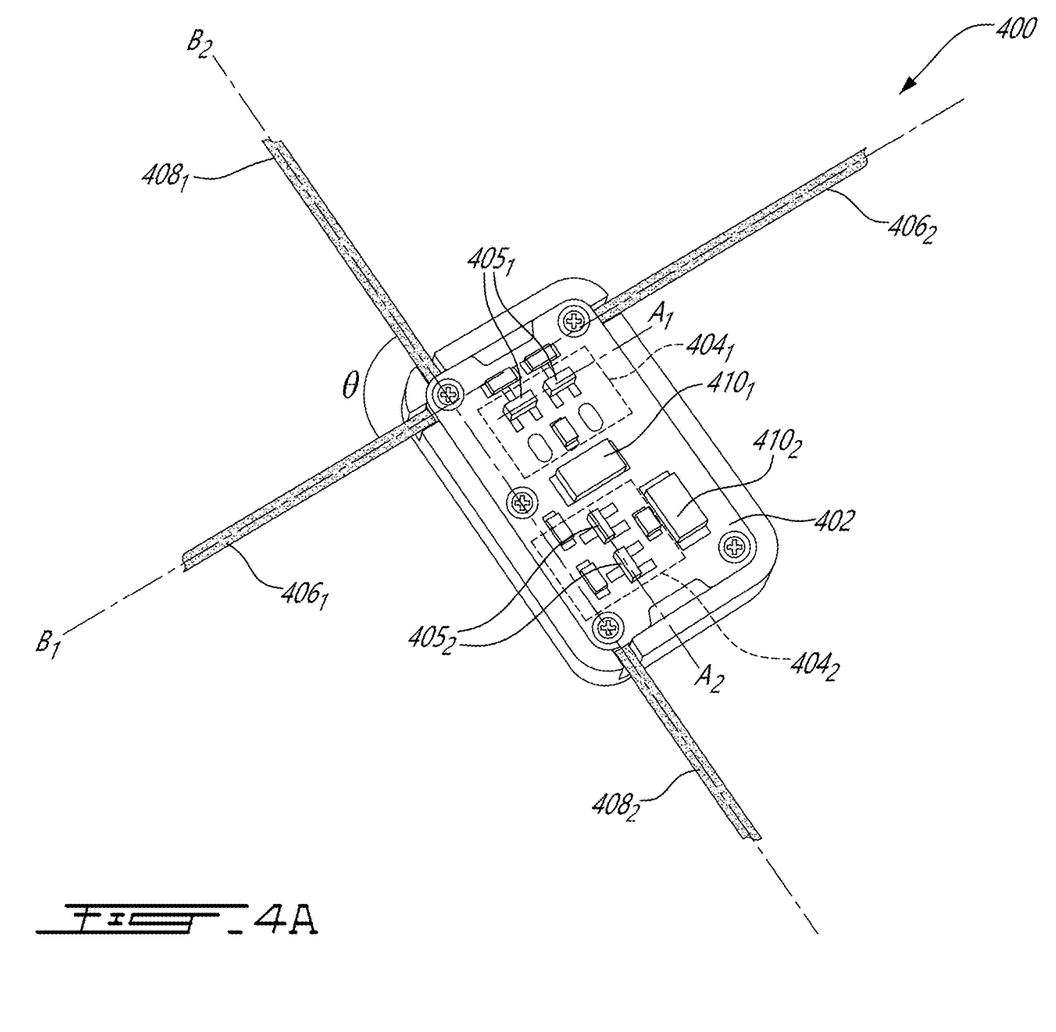
FIG. 4A is a photograph of a receiver unit comprising an orthogonal arrangement for use with the system of FIG. 1, in accordance with one embodiment.

In other embodiments, the antenna(s) 110 may comprise several antennas. For example, antenna arrays with multiple interconnected antennas (e.g., microstrip antennas combined to form linear or planar arrays) may apply. FIG. 4A illustrates one embodiment of a RF receiver unit 400 comprising two (2) antennas and two (2) rectifier circuits in an orthogonal arrangement. The RF receiver unit 400 has functionalities similar to those of the RF receiver 106 described herein above with reference to FIG. 1 and is configured to receive the RF waves 104 emitted by the RF transmitter 102.

In the embodiment of FIG. 4A, the RF receiver unit 400 is implemented on a PCB 402, which has two (2) rectifier circuits $404_1$, $404_2$ arranged thereon (i.e. overlaid in space without being electrically connected), the rectifier circuits $404_1$, $404_2$ comprising identical circuit elements. In this embodiment, the rectifier circuits $404_1$, $404_2$ are oriented at substantially ninety (90) degrees relative to one another (i.e. in an orthogonal arrangement). For this purpose, the respective circuit elements of the rectifier circuits $404_1$, $404_2$ are rotated by substantially ninety (90) degrees relative to one another. For example, the first rectifier circuit $404_1$ may comprise first circuit elements $405_1$ and the second rectifier circuit $404_2$ may comprise second circuit elements $405_2$, the first and second circuit elements $405_1$, $405_2$ being identical. In the proposed embodiment, the first circuit elements $405_1$ are arranged at a first orientation (e.g., so as to be aligned along axis $A_1$) in a first area of the PCB 402 and the second circuit elements $405_2$ are arranged at a second orientation (e.g., so as to be aligned along axis $A_2$) in a second area of the PCB 402, the second orientation being substantially perpendicular (i.e. at about ninety (90) degrees) to the first orientation. In this manner, the second circuit elements $405_2$ are rotated by about ninety (90) degrees relative to the first circuit elements $405_1$, resulting in the orthogonal arrangement of the rectifier circuits $404_1$, $404_2$.

In the illustrated embodiment, the rectifier circuit $404_1$ is electrically coupled to an antenna, which in this example is a dipole antenna represented by wires $406_1$, $406_2$. The wires $406_1$, $406_2$ extend away from the PCB 402 and are aligned along a first direction $B_1$ substantially parallel to the axis $A_1$. Similarly, the rectifier circuit $404_2$ is electrically coupled to an antenna, which in this example is a dipole antenna represented by wires $408_1$, $408_2$. The wires $408_1$, $408_2$ extend away from the PCB 402 and are aligned along a second direction $B_2$ substantially parallel to the axis $A_2$. The first direction $B_1$ is oriented at an angle θ relative to the second direction $B_2$, the angle θ being about ninety (90) degrees. In other words, the directions $B_1$, $B_2$ are substantially perpendicular. In this manner, the antennas coupled to the rectifier circuits $404_1$, $404_2$ are arranged so as to be oriented at substantially ninety (90) degrees relative to one another, and are thus physically perpendicular (i.e. in an orthogonal arrangement). Although an orthogonal arrangement is desirable, it should however be understood that, in some embodiments, the rectifier circuits $404_1$, $404_2$, and the respective antennas coupled thereto, may be oriented in any suitable manner such that the directions (e.g., $B_1$, $B_2$) may be positioned at any suitable angle θ. For example, the angle θ may be forty-five (45) degrees. Other embodiments may apply.

A first load $410_1$ (e.g., a first LED) may be electrically coupled to the output of the first rectifier circuit $404_1$, and a second load $410_2$ (e.g., a second LED) may be electrically coupled to the output of the second rectifier circuit $404_2$. In the illustrated embodiment, the loads $410_1$, $410_2$ are arranged orthogonally, with the first load $410_1$ being oriented along a direction (not shown) substantially parallel to the first direction $B_1$, and the second load $410_2$ being oriented along a direction (not shown) substantially parallel to the second direction $B_2$. It should however be understood that the loads $410_1$, $410_2$ need not be arranged orthogonally in all embodiments.

The antennas provided in the RF receiver unit 400 (e.g., coupled to or forming part of the rectifier circuits $404_1$, $404_2$) are polarized in the same manner as the antenna comprised in the RF transmitter 102. In this manner, the amount of RF energy that is transferred between the RF transmitter 102 and the RF receiver unit 400 is a function of the cosine of the angle between the RF transmitter 102 and the RF receiver unit 400 (assuming the RF transmitter 102 and the RF receiver unit 400 are facing each other). The configuration illustrated in FIG. 4A allows for the antennas of rectifier circuits $404_1$, $404_2$ to collectively receive the entirety (i.e. 100%) of the RF energy coming from the RF transmitter 102.

Figure 4B:
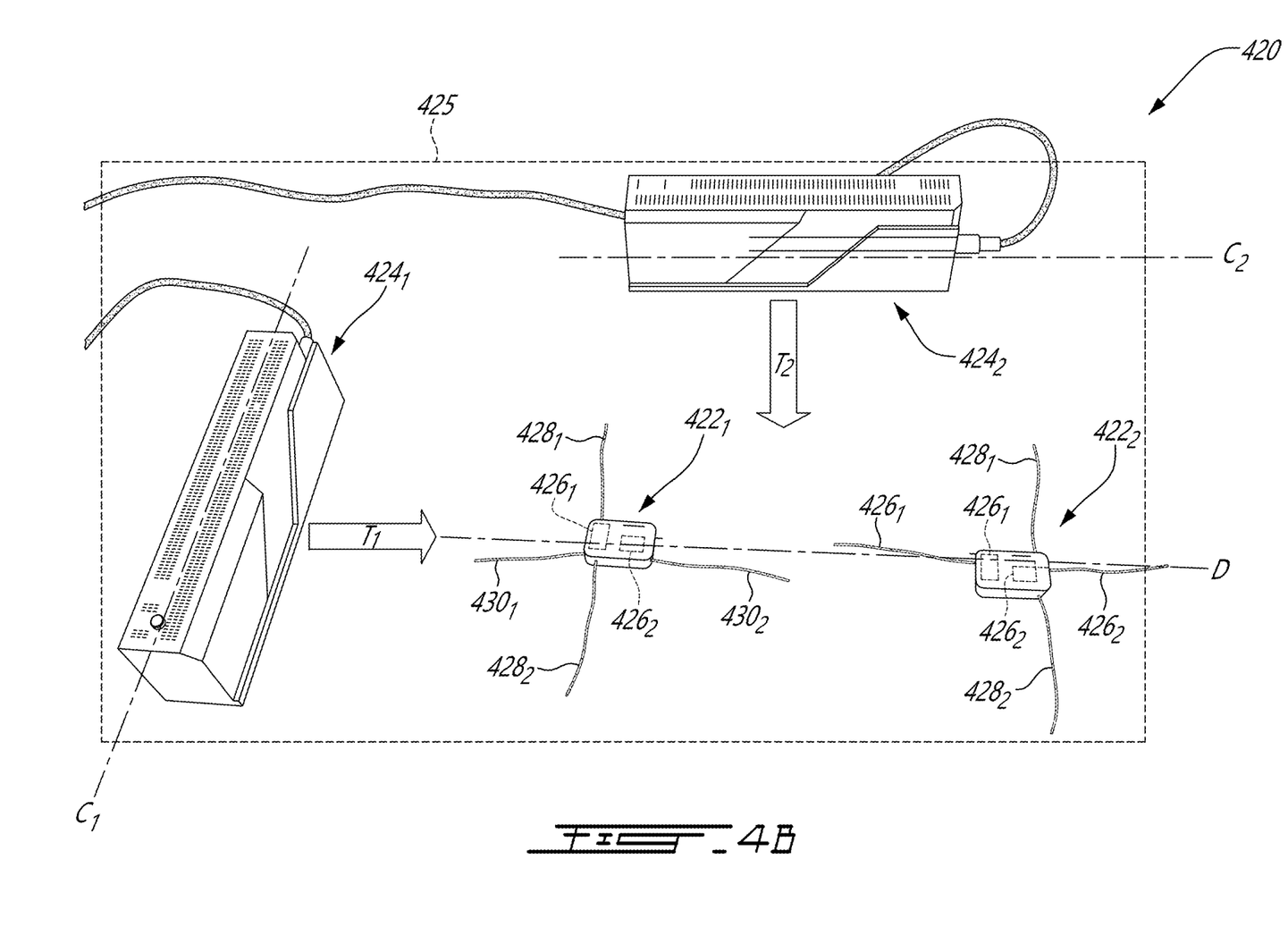
FIG. 4B is a photograph of an example system for wireless power transmission comprising multiple transmitters and multiple receivers, in accordance with one embodiment.

FIG. 4B illustrates an example setup 420 used for wireless power transmission in a system comprising multiple RF transmitters and multiple RF receivers. The setup 420 of FIG. 4B may be used to vary the power transmission coverage within a given area. In the illustrated setup 420, a first RF receiver unit $422_1$ and a second RF receiver unit $422_2$, each with functionalities are similar to those of the RF receiver unit 400 described herein above in relation to FIG. 4A, and a first RF transmitter $424_1$ (having a transmission path illustrated by arrow $T_1$) and a second RF transmitter $424_2$ (having a transmission path illustrated by arrow $T_2$), each with functionalities similar to those of the RF transmitter 102 of FIG. 1, are positioned with an area 425. The RF transmitters $424_1$, $424_2$ extend along respective directions $C_1$, $C_2$ which are substantially perpendicular (i.e. at oriented at ninety (90) degrees) relative to one another. Furthermore, the direction $C_1$ is substantially perpendicular to the transmission path indicated by arrow $T_1$ and the direction $C_2$ is substantially perpendicular to the transmission path indicated by arrow $T_2$.

The RF receiver units $422_1$, $422_2$ are spaced from one another and from the RF transmitters $424_1$, $424_2$, and positioned along the transmission path of one of the RF transmitters $424_1$, $424_2$. In particular, the RF receiver units $422_1$, $422_2$ are positioned along a direction substantially parallel to one of the directions $C_1$, $C_2$ along which the RF transmitters $424_1$, $424_2$ extend. In the illustrated embodiment, the RF transmitters $424_1$, $424_2$, are positioned along the transmission path (indicated by arrow $T_1$) of the first RF transmitter $424_1$, i.e. along a direction D substantially perpendicular to the direction $C_1$ (and parallel to the direction $C_2$). The first RF receiver unit $422_1$ is interposed between the first RF transmitter $424_1$ and the second RF receiver unit $422_2$. It should however be understood that the RF transmitters $424_1$, $424_2$, may be positioned along the transmission path (indicated by arrow $T_2$) of the second RF transmitter $424_2$, i.e. along a direction substantially perpendicular to the direction $C_2$ (and parallel to the direction $C_1$), with the first RF receiver unit $422_1$ being interposed between the second RF transmitter $424_2$ and the second RF receiver unit $422_2$.

Similarly to the RF receiver unit 400 of FIG. 4A, each RF receiver unit $422_1$, $422_2$ comprises two (2) rectifier circuits $426_1$, $426_2$ oriented at substantially ninety (90) degrees relative to one another. The first rectifier circuit $426_1$ of each RF receiver unit $422_1$, $422_2$ is also electrically coupled to a first antenna (e.g., represented by a first pair of wires $428_1$, $428_2$) and the second rectifier circuit $426_2$ of each RF receiver unit $422_1$, $422_2$ is electrically coupled to a second antenna (e.g., represented by a second pair of wires $430_1$, $430_2$). In the illustrated embodiment, the first rectifier circuit $426_1$ and the first pair of wires $428_1$, $428_2$ are arranged along a direction (not shown) substantially parallel to the direction $C_1$, and the second rectifier circuit $426_2$ and the second pair of wires $430_1$, $430_2$ are arranged along the direction D, which is substantially parallel to the direction $C_2$. As such, the rectifier circuits $426_1$, $426_2$ and the antennas coupled thereto are arranged so as to be oriented at substantially ninety (90) degrees relative to one another, and thus to be physically perpendicular (i.e. in an orthogonal arrangement).

When multiple RF receiver units are used with a single RF transmitter, a so-called "shadowing" effect may occur, in which the RF receiver unit(s) which are positioned further from the RF transmitter receive a lower amount of power than the RF receiver unit(s) positioned closer to the RF transmitter. Such shadowing effect may be the result of the obstruction between the RF transmitter and the RF receiver unit(s), such obstruction being created by one or more RF receiver unit(s) present on the transmission path of the RF transmitter. In the embodiment of FIG. 4B, when the RF transmitter $424_1$ is in operation, the RF receiver unit $422_2$ is shadowed by the RF receiver unit $422_1$ (which is interposed between the RF transmitter $424_1$ and the RF receiver unit $422_2$) and, as such, receives less power from the RF transmitter $424_1$ than the RF receiver unit $422_1$ (which is positioned closer to the RF transmitter $424_1$, with no obstruction between the RF receiver unit $422_1$ and the RF transmitter $424_1$). In the case where the loads electrically coupled to the RF receiver units $422_1$, $422_2$ are LEDs, the light intensity produced by the LED coupled to the RF receiver unit $422_2$ is therefore lower than the light intensity produced by the LED coupled to the RF receiver unit $422_1$.

In order to improve the power transmission coverage, the second RF transmitter $424_2$ may be activated (e.g., in addition to the first RF transmitter $424_1$). When the second RF transmitter $424_2$ is activated (i.e. turned on), both RF receiver units $422_1$, $422_2$ receive substantially the same amount of RF energy from the second RF transmitter $424_2$ since no obstruction is present on the transmission path (indicated by arrow $T_2$) of the second RF transmitter $424_2$. In this manner, the light intensity is produced by the LED coupled with the RF receiver unit $422_2$ can be improved, thereby overcoming or alleviating the shadowing effect describe above. Having two RF transmitters $424_1$, $424_2$ as illustrated in FIG. 4B may allow to handle complex shadowing effects that may occur when more than two (2) RF receiver units as in $422_1$, $422_2$ are positioned on a plane. In addition, adding a second RF transmitter $422_2$ may increase the number of orientations where RF energy is received, thus reducing the probability that the loads (e.g., lights) are unexpectedly activated and deactivated and improving the overall user experience.

Figure 5A:
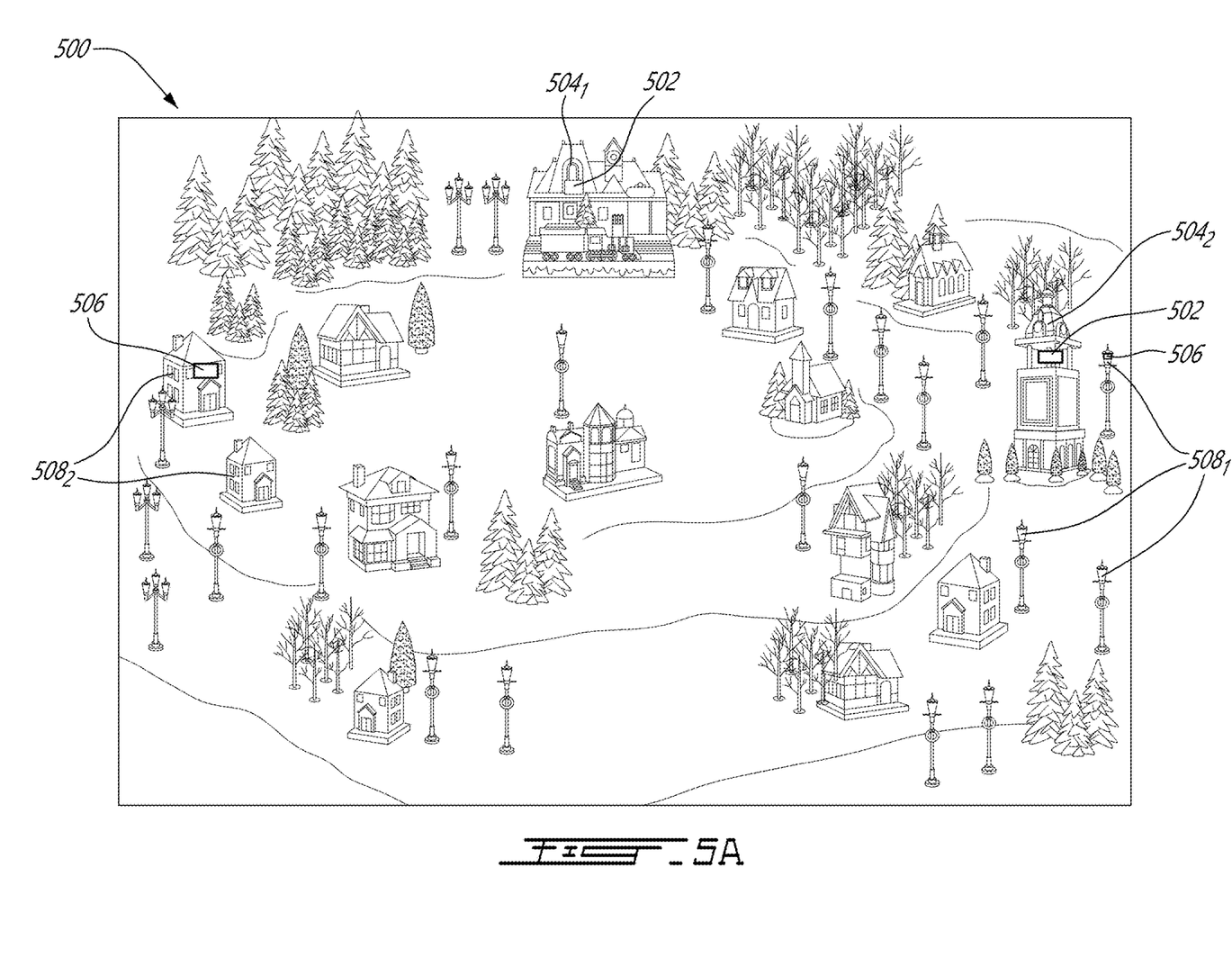
FIG. 5A is a schematic diagram of a Christmas village decoration setup using the system of FIG. 1, in accordance with one embodiment.

The systems and methods described herein may find application in various environments. FIG. 5A illustrates one such environment, namely a Christmas village decoration setup 500 comprising multiple decorative elements or objects, such as lights, houses, train stations, churches, bell towers, trees, cars, horse drawn carriages, and the like. One or more RF transmitters and one or more RF receivers are incorporated into one or more objects that are part of the decoration setup 500. For example, an RF transmitter 502 may be incorporated into (i.e. integrated with mechanical components of) each of a train station $504_1$ and a bell tower $504_2$. An RF receiver 506 and one or more loads (e.g., electric lights) may be integrated in one or more remaining elements of the setup 500, such as in one or more of the streetlamps $508_1$ and in one or more of the houses $508_2$. In this embodiment, dipole antennas are used for the RF receivers 506, with all the dipole antennas being oriented vertically and all RF transmitters 502 being arranged in a fixed orientation. As understood by those skilled in the art, dipole antennas are omnidirectional in the plane perpendicular to the antenna axis. Using dipole antennas for the RF receivers 506 thus ensures that the antennas receive RF waves that are polarized at the right angle. In addition, because the RF receivers 506 are omnidirectional in the same plane, lit items (e.g., electric lights) may be placed in any orientation without suffering any loss of receiver sensitivity.

Users may purchase multiple decorative elements to decorate their house and such elements may be positioned and moved freely within the setup 500 to create a desired effect (e.g., lighting effect). In operation, when a first element of the setup 500 (e.g., a streetlamp $508_1$ or a house $508_2$) containing an RF receiver 506 is positioned within the effective transmission range of a second element (e.g., the train station $504_1$ or the bell tower $504_2$) containing an RF transmitter 502, the RF receiver 506 receives RF waves from the RF transmitter 502, converts the RF waves to DC output power, and the one or more loads (e.g., electric lights) integrated in the first element are operated (e.g., illuminated) based on the DC output power.

Figure 5B:
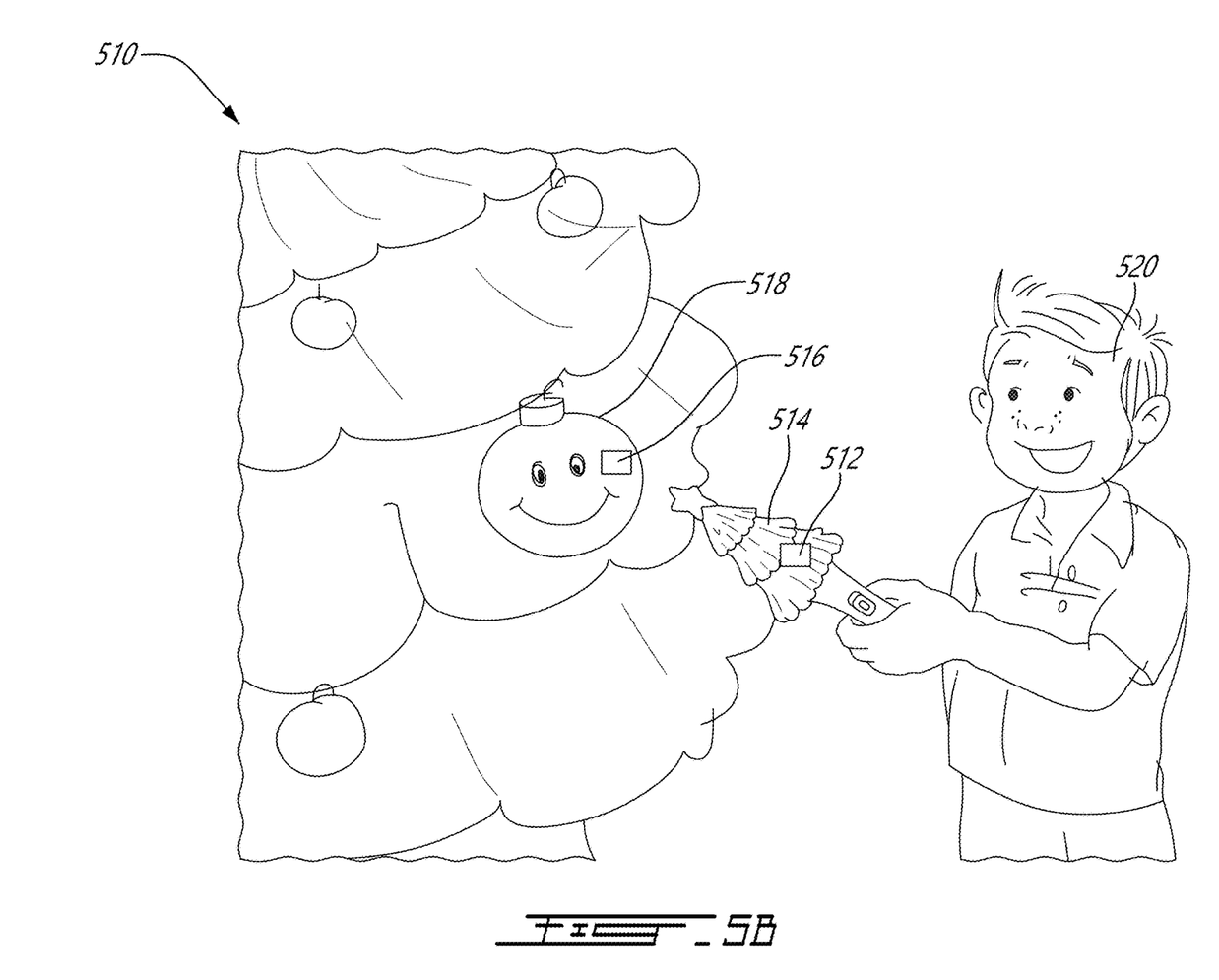
FIG. 5B is a schematic diagram of a Christmas tree decoration setup using the system of FIG. 1, in accordance with one embodiment.

FIG. 5B illustrates another environment in which the systems and methods described herein may find application. In the embodiment of FIG. 5B, the systems and methods described herein are applied to a Christmas tree decoration setup 510. An RF transmitter 512 may be integrated into a battery-operated wand 514 and an RF receiver 516 may be integrated into a Christmas ball ornament 518. Although a single ornament 518 is illustrated and described herein, it should be understood that this is for clarity purposes and that more than one ornament 518 having an RF receiver 516 integrated therewith may apply. In operation, a user 520 operating the wand 514 may turn the wand 514 on (e.g., by pushing an "ON" button provided thereon, not shown) to activate the RF transmitter 512 and cause the latter to emit RF waves into free space. When the wand 514 is brought in proximity to the ornament 518 (i.e. within the effective receiving range of the RF receiver 516) by the user 520, the RF waves emitted by the RF transmitter 512 are received at the RF receiver 516. The RF receiver 516 in turn converts the RF waves into DC output power, which is used to operate (e.g., illuminate) one or more electric lights contained in the ornament 518. The user 520 may then use their wand 514 to search for and find specific ornaments as in 518 which glow when the wand 514 is in their proximity.

Using the systems and methods described herein, various activities (e.g., treasure hunts, scavenger hunts, and the like) may therefore be created without the limitation of power source or cable wiring. Indeed, while the examples of FIGS. 5A and 5B relate to Christmas decorations, it should be understood that RF transmitter(s) and RF receiver(s) may be integrated into any suitable object having any suitable shape and size including, but not limited to, Easter eggs, toys, and the like.

Figure 6:
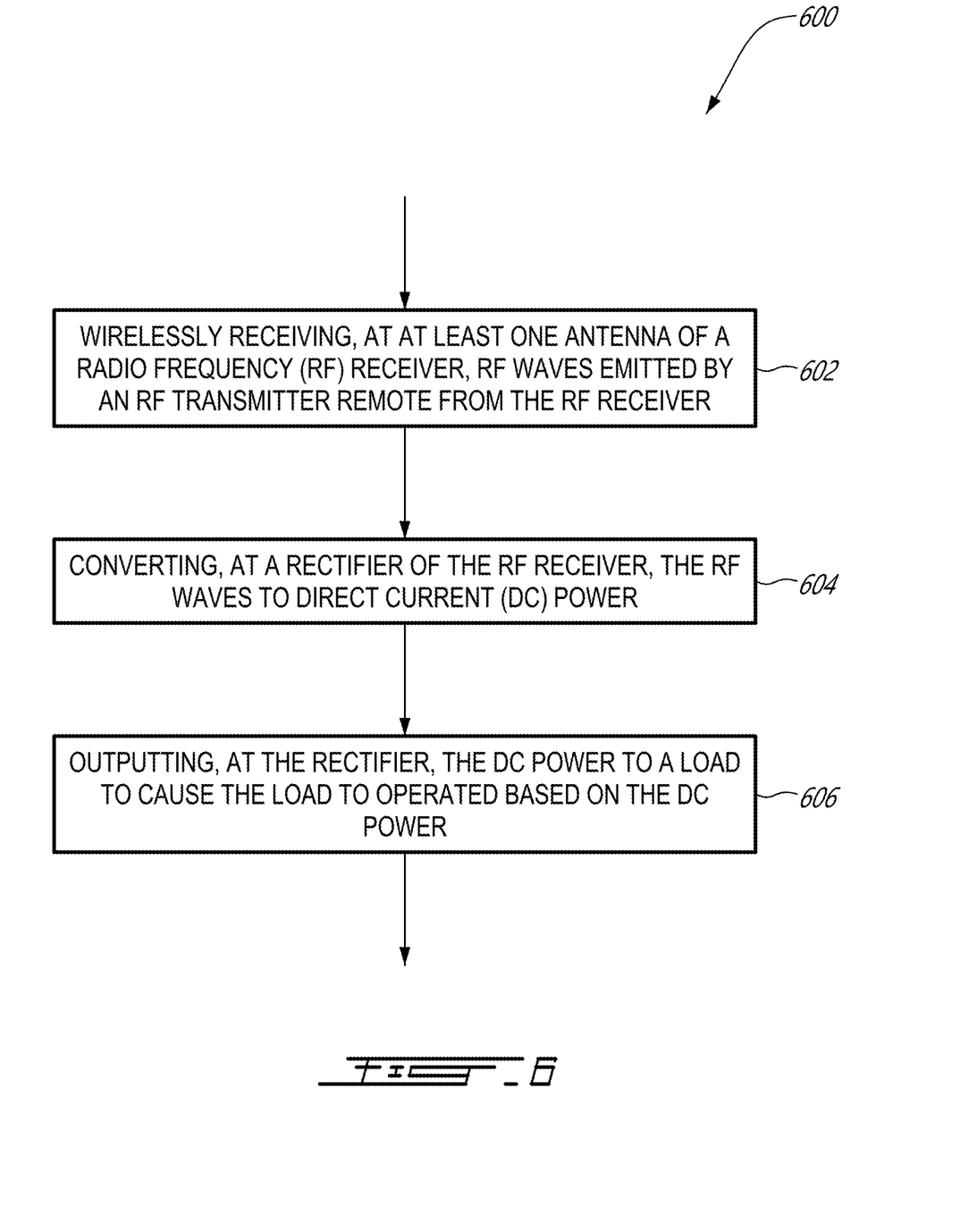
FIG. 6 is a flowchart of an example method for wireless power transmission, in accordance with one embodiment.

Referring now to FIG. 6, a method 600 for wireless power transmission will now be described, in accordance with one embodiment. The method 600 comprises, at step 602, wirelessly receiving, at least one antenna of an RF receiver, RF waves emitted by an RF transmitter remote from the RF receiver. The RF transmitter and the RF receiver may be as described herein above with reference to FIG. 1 to FIG. 4B. At step 604, the method 600 comprises converting, at a rectifier of the RF receiver, the RF waves to direct current (DC) power. The conversion may be performed at the RF rectifier in the manner described herein above with reference to FIG. 2. At step 606, the method 600 comprises outputting, at the rectifier, the DC power to at least one load to cause the at least one load to operate based on the DC power. In one embodiment, the at least one load comprises at least one electric light, as described herein above.

In some embodiments, the systems and methods described herein may alleviate the need for wiring, allowing for electrical power to be transmitted anywhere where wiring proves to be an inconvenient way of transmitting electrical energy. Using the systems and method described herein may also allow to reduce the complexity and costs associated with implementation of a wireless power transmission system.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. The scope is indicated by the appended claims.

What is claimed is:

1. A system for wireless power transmission, the system comprising:
    at least one radio frequency transmitter configured to emit radio frequency waves, the at least one radio frequency transmitter comprising a first radio frequency transmitter and a second radio frequency transmitter;
    at least one radio frequency receiver remote from the at least one radio frequency transmitter, the at least one radio frequency receiver comprising:
        at least one antenna configured to wirelessly receive the radio frequency waves from the at least one radio frequency transmitter, and
        at least one rectifier electrically coupled to the at least one antenna and configured to convert the radio frequency waves to direct current (DC) power,
    wherein the at least one radio frequency receiver comprises a first radio frequency receiver and a second radio frequency receiver positioned along a transmission path of one of the first radio frequency transmitter and the second radio frequency transmitter, the first radio frequency receiver interposed between the second radio frequency receiver and the one of the first radio frequency transmitter and the second radio frequency transmitter, and
    further wherein the first radio frequency receiver receives from the one of the first radio frequency transmitter and the second radio frequency transmitter a lower amount of radio frequency energy than the second radio frequency receiver, and the first radio frequency receiver and the second radio receiver receive a same amount of radio frequency energy from the other one of the first radio frequency transmitter and the second radio frequency transmitter; and
    at least one load electrically coupled to the at least one radio frequency receiver, the at least one load configured to receive from the at least one rectifier the DC power and to operate based thereon.

2. The system of claim 1, wherein the at least one rectifier comprises a first rectifier circuit and a second rectifier circuit oriented at ninety (90) degrees relative to one another.

3. The system of claim 2, wherein the at least one antenna comprises a first antenna electrically coupled to the first rectifier circuit, and a second antenna electrically coupled to the second rectifier circuit, the first antenna and the second antenna oriented at ninety (90) degrees relative to one another.

4. The system of claim 1, wherein the first radio frequency transmitter and the second radio frequency transmitter are oriented at ninety (90) degrees relative to one another.

5. The system of claim 1, wherein the at least one antenna comprises one of a microstrip patch antenna, a dipole antenna, a folded dipole antenna, a circular antenna, a Yagi-Uda antenna, a monopole antenna, a coplanar patch antenna, a spiral antenna, and a parabolic antenna.

6. The system of claim 1, wherein the at least one antenna comprises an array of interconnected antennas.

7. The system of claim 1, wherein the at least one antenna is configured to radiate the radio frequency waves received from the at least one radio frequency transmitter in a plurality of directions, and further wherein the at least one antenna comprises a grounded reflector configured to reflect at least part of the radio frequency waves in a given one of the plurality of directions for increasing a gain of the at least one antenna in the given direction.

8. The system of claim 1, wherein the at least one antenna receives the radio frequency waves each comprising a positive half-cycle and a negative half-cycle, further wherein the at least one rectifier comprises a first half-wave diode rectifier configured to allow the positive half-cycle therethrough to generate a first DC voltage, and a second half-wave diode rectifier electrically coupled to the first half-wave diode rectifier and configured to allow the negative half-cycle therethrough to generate a second DC voltage, the at least one rectifier configured to output the DC power comprising a combination of the first DC voltage and the second DC voltage.

9. The system of claim 1, wherein the at least one radio frequency receiver further comprises at least one energy storage device electrically coupled to the at least one rectifier, the at least one energy storage device configured to receive at least part of the DC power from the at least one rectifier and to store therein the at least part of the DC power.

10. The system of claim 1, wherein the at least one load comprises at least one device configured to produce light based on the DC power.

11. The system of claim 1, wherein the at least one radio frequency transmitter and the at least one radio frequency receiver are spaced by a distance lower than or equal to about two meters.

12. The system of claim 1, wherein the at least one radio frequency transmitter and the at least one radio frequency receiver are configured to operate in a range of frequencies between about 10 MHz and about 6 GHz.

13. The system of claim 1, wherein the at least one radio frequency transmitter is configured to emit the radio frequency waves having a center frequency of about 915 MHz.

14. The system of claim 1, wherein the at least one radio frequency transmitter has an effective radiated power of about 3 Watts.

15. A radio frequency receiver comprising:
at least one antenna configured to wirelessly receive radio frequency waves emitted by at least one radio frequency transmitter remote from the radio frequency receiver, the at least one radio frequency transmitter comprising a first radio frequency transmitter and a second radio frequency transmitter; and
at least one rectifier electrically coupled to the at least one antenna and configured to convert the radio frequency waves to direct current (DC) power and to output the DC power to at least one load to cause the at least one load to operate based on the DC power,
wherein the radio frequency receiver is a first radio frequency receiver configured to be positioned along a transmission path of one of the first radio frequency transmitter and the second radio frequency transmitter, the first radio frequency receiver configured to be interposed between a second radio frequency receiver and the one of the first radio frequency transmitter and the second radio frequency transmitter,
further wherein the first radio frequency receiver is configured to receive from the one of the first radio frequency transmitter and the second radio frequency transmitter a lower amount of radio frequency energy than the second radio frequency receiver, and the first radio frequency receiver is configured to receive from the other one of the first radio frequency transmitter and the second radio frequency transmitter a same amount of radio frequency energy as the second radio frequency receiver.

16. The radio frequency receiver of claim 15, wherein the at least one rectifier comprises a first rectifier circuit and a second rectifier circuit oriented at ninety (90) degrees relative to one another.

17. The radio frequency receiver of claim 16, wherein the at least one antenna comprises a first antenna electrically coupled to the first rectifier circuit, and a second antenna electrically coupled to the second rectifier circuit, the first antenna and the second antenna oriented at ninety (90) degrees relative to one another.

18. The radio frequency receiver of claim 15, wherein the at least one antenna comprises one of a microstrip patch antenna, a dipole antenna, a folded dipole antenna, a circular antenna, a Yagi-Uda antenna, a monopole antenna, a coplanar patch antenna, a spiral antenna, and a parabolic antenna.

19. The radio frequency receiver of claim 15, wherein the at least one antenna comprises an array of interconnected antennas.

20. The radio frequency receiver of claim 15, wherein the at least one antenna is configured to radiate the radio frequency waves received from the at least one radio frequency transmitter in a plurality of directions, and further wherein the at least one antenna comprises a reflector configured to reflect at least part of the radio frequency waves in a given one of the plurality of directions for increasing a gain of the at least one antenna in the given direction.

21. The radio frequency receiver of claim 15, wherein the at least one antenna receives the radio frequency waves each comprising a positive half-cycle and a negative half-cycle, further wherein the at least one rectifier comprises a first half-wave diode rectifier configured to allow the positive half-cycle therethrough to generate a first DC voltage, and a second half-wave diode rectifier electrically coupled to the first half-wave diode rectifier and configured to allow the negative half-cycle therethrough to generate a second DC voltage, the at least one rectifier configured to output the DC power comprising a combination of the first DC voltage and the second DC voltage.

22. The radio frequency receiver of claim 15, wherein the radio frequency receiver further comprises at least one energy storage device electrically coupled to the at least one rectifier, the at least one energy storage device configured to receive at least part of the DC power from the at least one rectifier and to store therein the at least part of the DC power.

23. A method for wireless power transmission, the method comprising:

wirelessly receiving, at at least one antenna of at least one radio frequency receiver, radio frequency waves emitted by at least one radio frequency transmitter remote from the at least one radio frequency receiver,
  wherein the at least one radio frequency transmitter comprises a first radio frequency transmitter and a second radio frequency transmitter, and the at least one radio frequency receiver comprises a first radio frequency receiver and a second radio frequency receiver positioned along a transmission path of one of the first radio frequency transmitter and the second radio frequency transmitter, the first radio frequency receiver interposed between the second radio frequency receiver and the one of the first radio frequency transmitter and the second radio frequency transmitter, and
  further wherein the first radio frequency receiver receives from the one of the first radio frequency transmitter and the second radio frequency transmitter a lower amount of radio frequency energy than the second radio frequency receiver, and the first radio frequency receiver and the second radio receiver receive a same amount of radio frequency energy from the other one of the first radio frequency transmitter and the second radio frequency transmitter;
converting, at at least one rectifier of the at least one radio frequency receiver, the radio frequency waves to direct current (DC) power; and
outputting, at the at least one rectifier, the DC power to at least one load to cause the at least one load to operate based on the DC power.

* * * * *